UNITED STATES PATENT OFFICE.

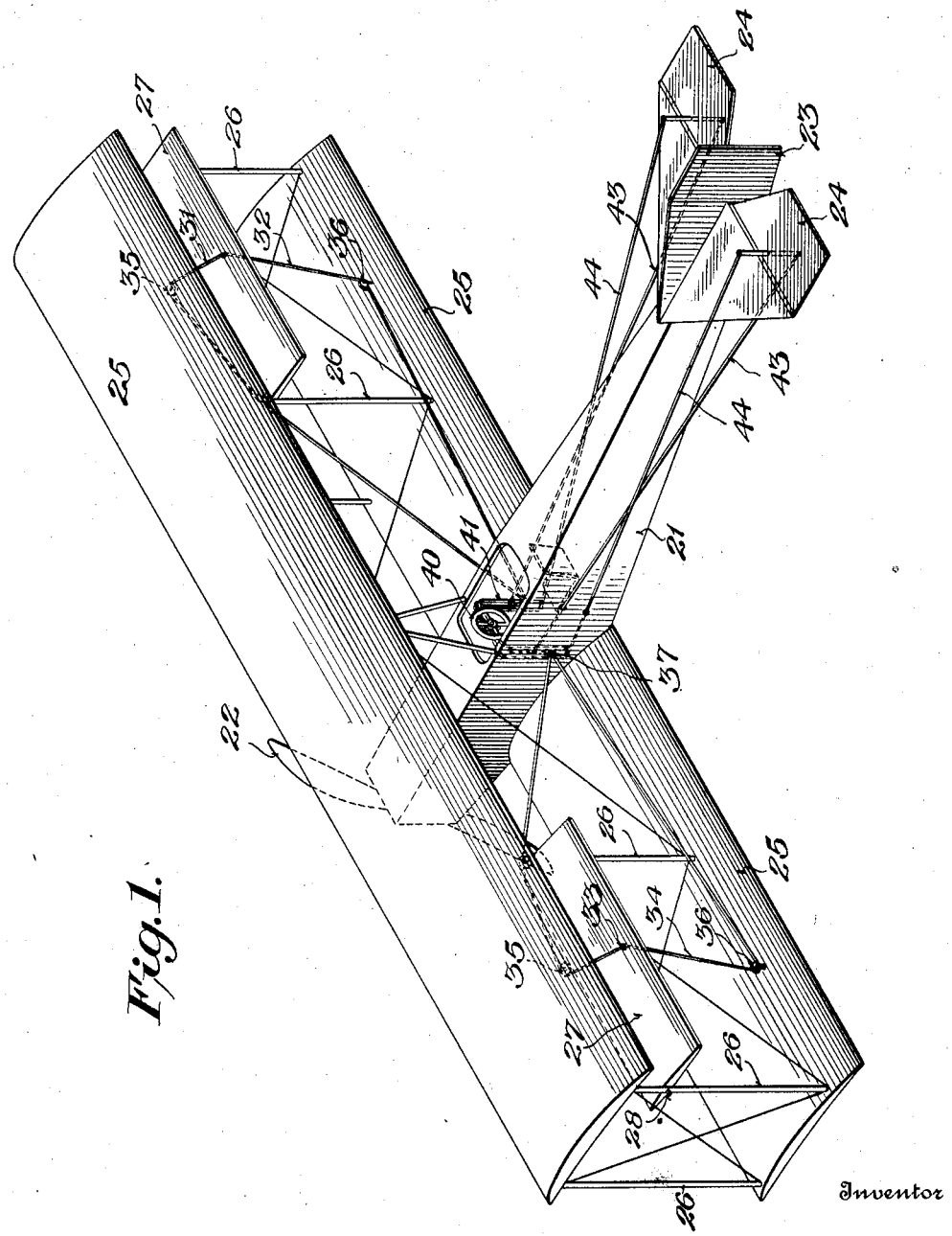

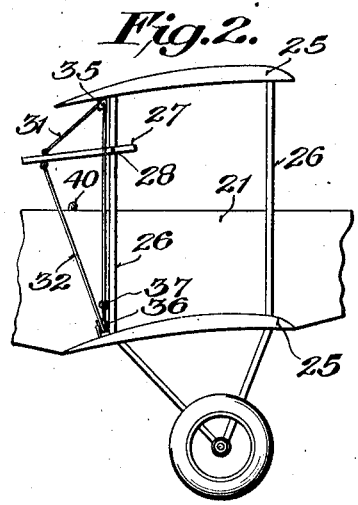
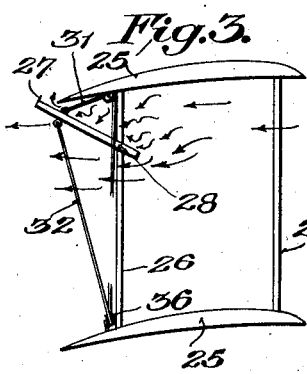
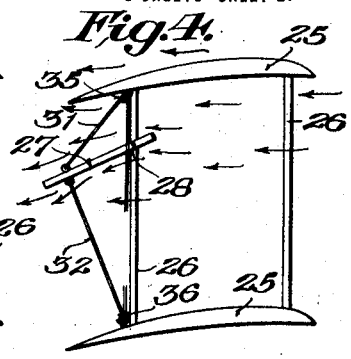
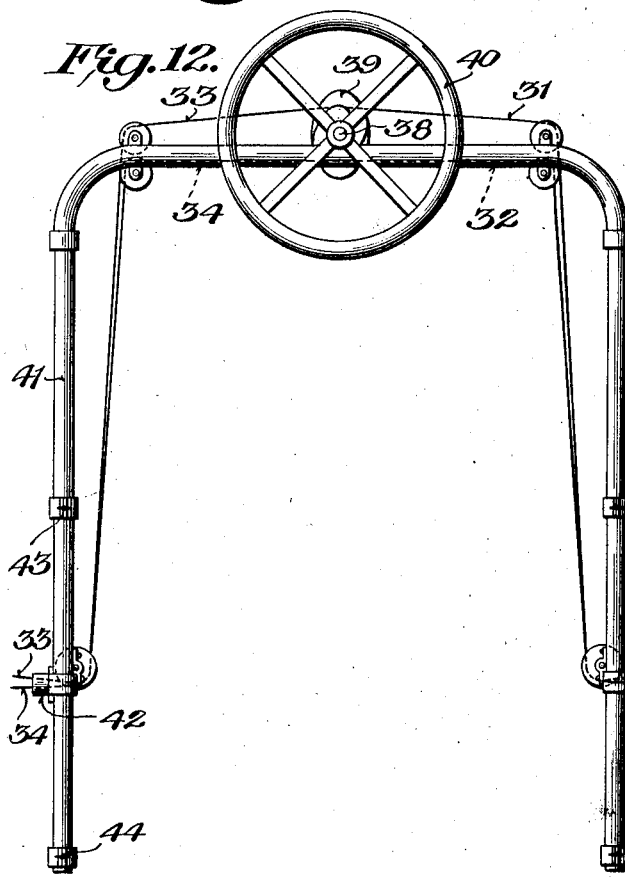
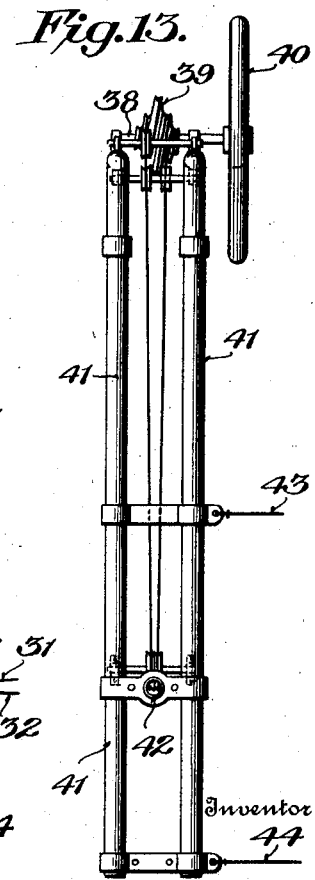

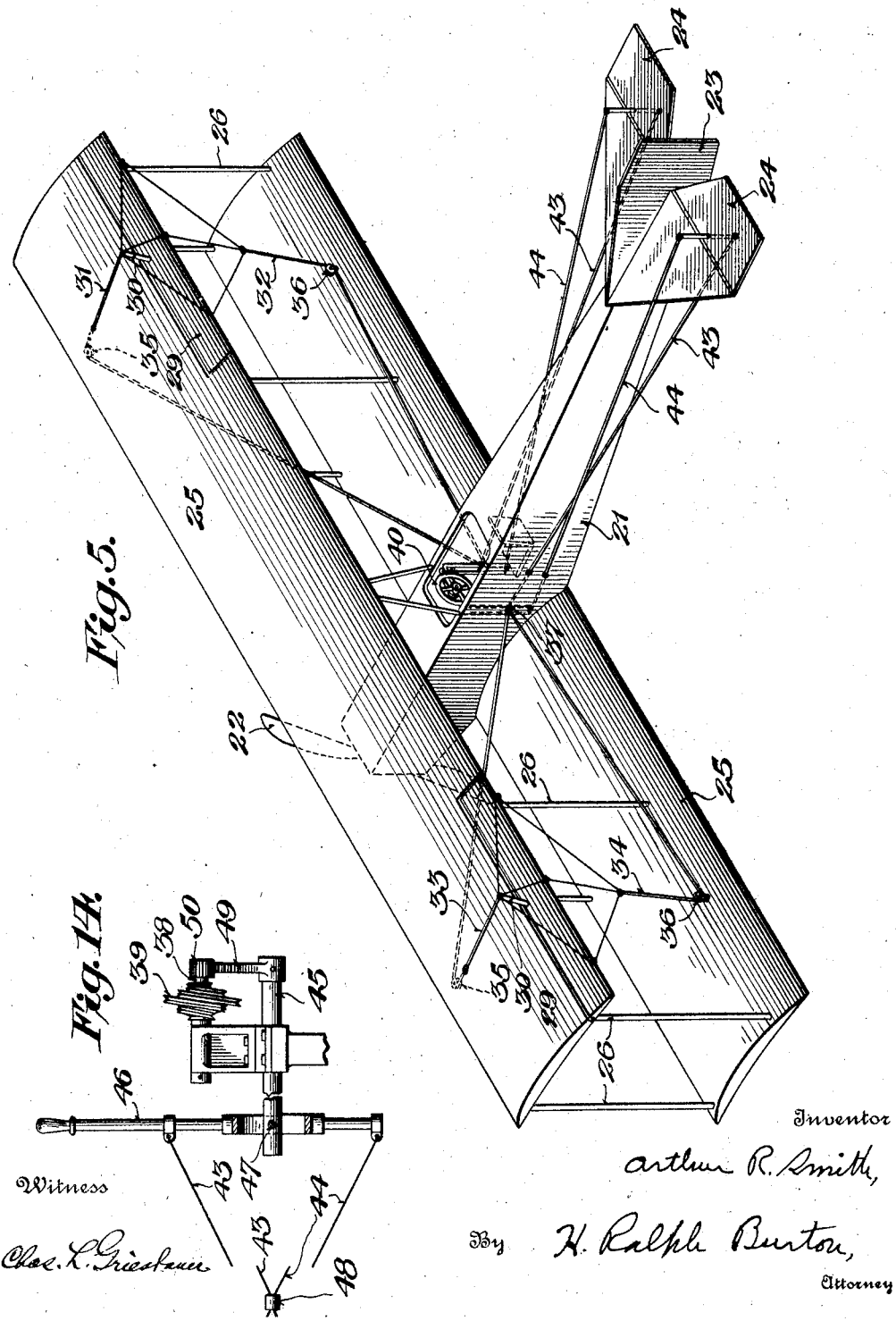

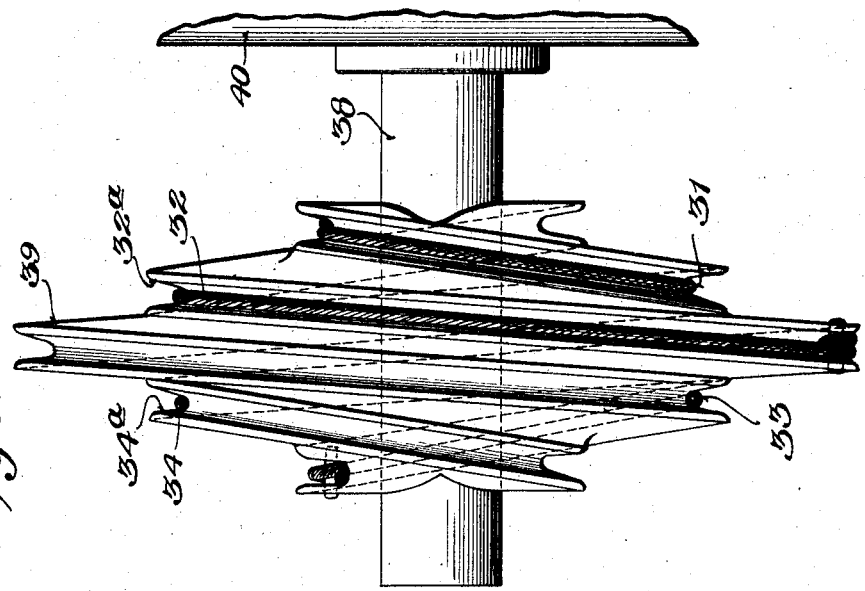
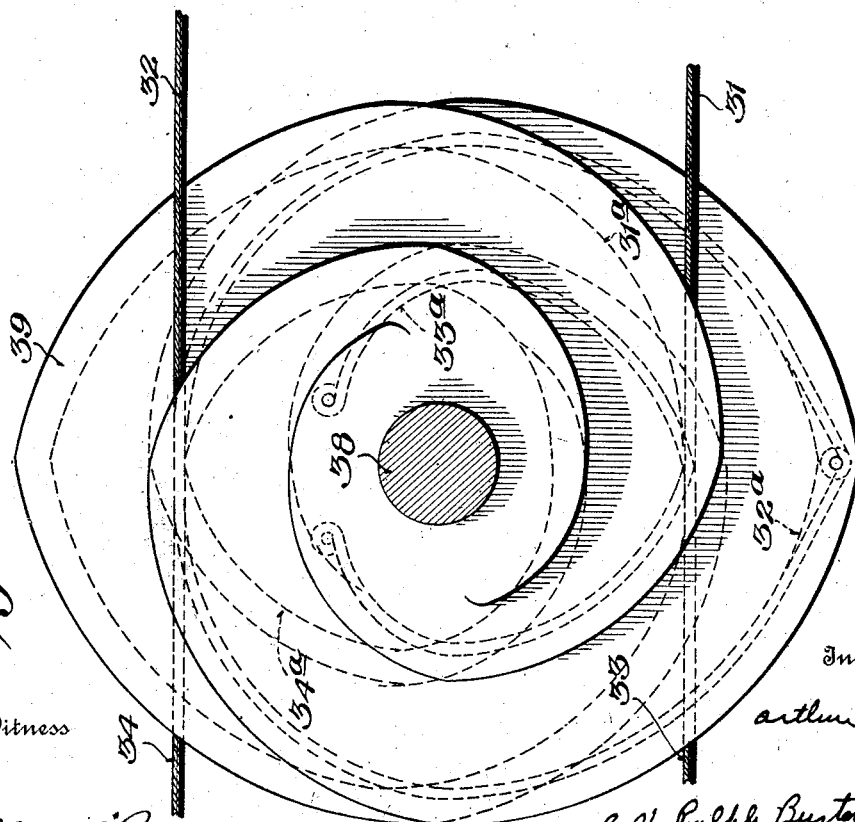

ARTHUR R. SMITH, OF FORT WAYNE, INDIANA.

AIRPLANE.

1,361,502.  Specification of Letters Patent.  Patented Dec. 7, 1920.

Application filed June 4, 1918. Serial No. 238,195.

*To all whom it may concern:*

Be it known that I, ARTHUR R. SMITH, a citizen of the United States, residing at Fort Wayne, in the county of Allen and State of Indiana, have invented certain new and useful Improvements in Airplanes, of which the following is a specification, reference being had therein to the accompanying drawings.

This invention relates to control means in an airplane to overcome the tendency of the machine to tip laterally under the influence of uneven air currents.

Uneven or irregular air currents and other atmospheric conditions have the effect of disturbing the lateral balance or equilibrium of an airplane, and it is necessary to provide means to overcome or counteract such interference with the regular course of the machine through the air.

For this purpose, it is the usual practice to mount in each side portion of the machine one or more ailerons so arranged that, through the instrumentality of suitable operating means, the angle of incidence of the ailerons with respect to the sustention plane or planes may be altered when lateral tipping or tendency thereto occurs, the one or more ailerons on the low side being set at an angle to lift that side and the one or more ailerons on the other or high side at an angle to depress it. Ailerons of various characteristics and in various positions heretofore have been used for this purpose.

The tendency of one side of an airplane to drop with respect to the other, and thus of the machine to tip laterally, may result from several causes. When ailerons that are hinged to form rear marginal portions at each end of one or more sustention-planes are set at equal opposite angles with respect to the plane or planes to restore equilibrium, the one or more on the low side to lift it and the one or more on the high side to cause depression of that side, it has been found that greater resistance is offered to the air or to forward motion of the machine on the low than on the high side, and that, therefore, there is a decided tendency of the machine to turn toward the low side. Accordingly, as the speed of the low side is lessened as compared with that of the high side, the lifting effort of the sustention plane or planes and of the aileron or ailerons is lessened on the low side, while the other side proceeds at greater speed and sustaining action. These forces set up by this turning action of the machine are opposite to what is desired. Therefore, the process of restoring equilibrium is interfered with materially, and under some circumstances great difficulty and danger may result.

In view of these factors, it is desirable that the machine be made to turn toward the high side, rather than toward the low, in order that the sustention plane or planes, by having greater speed on the low and less on the high side, may themselves contribute to the raising of the low side and the restoration of equilibrium, without depending entirely upon the partially ineffective and unsatisfactory action of the ailerons as ordinarily controlled. The more a machine has tipped, the more this action is desired.

It is an object of the invention to cause an airplane, when lateral balance is disturbed and the ailerons are set to restore equilibrium, to turn toward the high side and thus obtain the advantages incident to such turning.

This object is attained by a particular arrangement of ailerons, and by the provision of operating means therefor that simultaneously will move from normal position the aileron or ailerons on the high side to a depressing angle and the one or ones on the low side to a relatively less lifting angle—that is, so that the high aileron or ailerons will be moved through a greater arc than the low one or ones.

Thus the high aileron or ailerons, set at a greater angle, will offer greater resistance to forward motion than the low one or ones and cause the machine to turn toward the high side.

The ratio of movement of the ailerons to each other as they are moved to angular position with respect to the sustention plane or planes in any particular machine is dependent upon the amount of resistance required to attain this turning toward the high side. Some types of machines require a different ratio than others. When a small amount of lateral tipping has occurred and the ailerons are set to correct it, this turning toward the high side is but slightly, if at all, required. However, when the tipping has been excessive, then a decided turning toward the high side is desirable. By adjusting the ratio of one aileron to the other and thereby regulating the amount of resistance to forward motion in each side of the machine, the turning action of the machine can be altered or regulated.

The operating means provided by the invention for setting ailerons at different opposite angularity may be employed with those hinged to form parts of one or more of the sustention-planes and with those mounted independently of the planes.

Further, the invention contemplates the location of ailerons in such position with respect to a sustention-plane that the one that may be on the high side may have its rear portion drawn up to or close to the plane and thus form therewith a pocket that will offer a decided resistance to the air and thus more certainly operate to cause the machine to turn toward the high side.

When read in connection with the description herein, the details of construction and arrangement of parts contemplated by the invention will be apparent from the accompanying drawings, forming part hereof, wherein embodiments of the invention are exemplified, for purposes of illustration.

While the disclosures herein now are considered to exemplify preferable embodiments of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, in which certain structural details not pertaining to the invention are omitted, and of which—

Figure 1 is a perspective view of a tractor type of biplane, with one type of ailerons in approximately normal position;

Fig. 2 is a right-side view showing the approximately normal position of an aileron between the two planes;

Fig. 3 is a similar view showing an aileron approximately at its maximum pocketing position;

Fig. 4 is a similar view showing an aileron approximately at the maximum lifting angle it would have when its side is low;

Fig. 5 is a perspective view of a tractor type of biplane, with ailerons pivotally mounted to form rear marginal portions of the ends of a sustention-plane;

Fig. 8 is a face view of a member for differentially winding and unwinding the wires or other flexible members arranged to operate the ailerons;

Fig. 9 is an edge view of that member;

Fig. 12 is a front elevation of a mounting of a winding and unwinding means;

Fig. 13 is a side elevation thereof; and

Fig. 14 is a diagrammatic view of another form of mounting for the winding and unwinding means.

Referring more particularly to the drawings, 21 designates the fuselage, 22 the propeller, 23 the vertical rudder, 24 the elevation-rudders, 25 the sustention-planes, and 26 the upright struts of an airplane.

The struts 26 extend from one plane to the other, for the purpose of maintaining the planes in proper relation to each other, and one series of struts is positioned near the front and another series near the rear of the planes.

In one adaptation of the invention, as illustrated by Figs. 1 to 4, inclusive, an aileron 27, for the purposes hereinbefore mentioned, is pivotally mounted in each side portion of the airplane, in a position removed from and below the rear portion of the upper plane, and on an axis substantially parallel to that of the planes. Each aileron is pivoted at a place nearer the front edge than the rear. The ailerons are located in the same relative positions in each side portion of the machine, and they may be mounted in any suitable manner, as on shafts 28, each of which is supported at its ends in two of the rear series of struts 26. Each aileron is of such size and is so located that its rear portion may be swung upwardly to or nearly to the rear edge of the upper plane.

Figure 6:
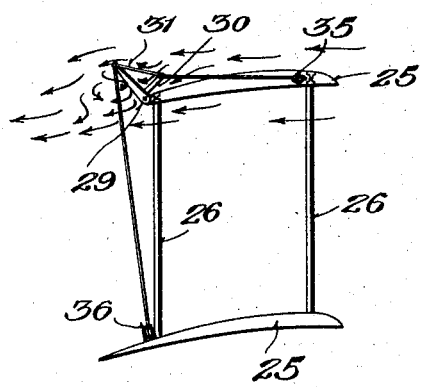
Fig. 6 is a side view showing, at approximately its maximum depressing angle, an aileron such as shown by Fig. 5.
Figure 7:
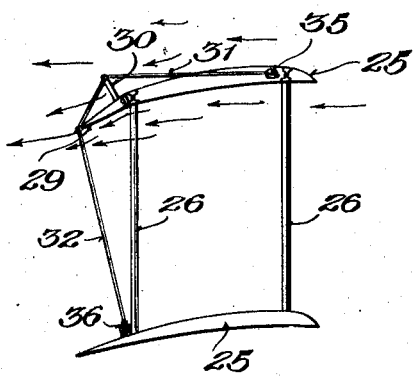
Fig. 7 is a similar view showing that type of aileron at approximately the maximum lifting angle it would have when its side is low.

The invention also is adapted for use with ailerons 29 pivotally mounted to form rear marginal portions of the ends of a sustention-plane, as illustrated by Figs. 5, 6, and 7, such an aileron having a member 30 upstanding from about its pivotal axis.

The ailerons may be controlled from operating means in the fuselage through any suitable instrumentalities. As shown, the aileron in the right-hand side has connected to it an upper control-wire 31 and a lower control-wire 32, and that in the left-hand side an upper control-wire 33 and a lower control-wire 34.

The two wires of each aileron are oppositely tensioned and connected to it at places to the rear of its pivotal axis, and in the case of the marginal type the members 30 carry the upper wires and afford leverage for their action. The upper wires 31 and 33 lead through sheaves 35 in the upper portion of the machine, and the lower wires 32 and 34 through sheaves 36 in the lower portion of the machine, and the wires lead through guides 37 into the fuselage. The arrangement is such that, when one wire of an aileron is pulled and the other paid out, the aileron will be swung to a different angle with respect to the sustention-plane.
The normal position of the ailerons is the one in which they are maintained when the machine is proceeding with undisturbed equilibrium. Ordinarily the normal position of the ailerons below a sustention-plane is in a plane substantially parallel to the chord of the sustention-plane, and of the marginal type of ailerons in continuance of the curve of the plane of which they are parts.
When the ailerons are to be moved from normal position to restore equilibrium, the one on the high side at a depressing angle and that on the low side at a lifting angle, it is desirable to set the high one at a greater relative angle than the low one, for the reasons hereinbefore explained, and the invention provides a single operating device associated with the control connections 31, 32, 33, and 34 for thus differentially setting the ailerons.

As a part of this operating device, a rotatable shaft 38 is mounted in the fuselage, and it has fixed thereon a winding-drum 39, of generally double-cone contour with a common base. To the drum are connected the wires 31, 32, 33, and 34, which wind and unwind in grooves provided therefor, there being two grooves on each side of the drum, and those on one side being for the wires of one aileron and those on the other side for the wires of the other aileron.

Each pair of grooves for a pair of wires commences near the axis at a place substantially diametrically opposite to the other, and it continues in a contour increasing in distance from the axis toward the greater periphery of the drum, the grooves of each pair being substantially identical in contour. Usually a groove will have substantially spiral contour, but it may have complex or other contour, the particular form being dependent upon the demands of the machine to which the drum is adjusted.

After the maximum movement—at the correct ratio of movement—of the ailerons has been found for any particular machine, the grooves of the winding drum that receive the wire drawn in to produce this movement are shaped in such contour that they will take this correct amount of wire; and the grooves that pay out the wire that compensates for that drawn in are so contoured that just the correct amount will be paid out to maintain normal tension in the system of control-wires.

An end of a wire is secured in a groove at or adjacent to the place of commencement of the groove near the axis. The arrangement is such that, as the shaft and drum are rotated, one wire of each pair will be wound on and the other wire of the same pair will be unwound at increasing or decreasing speed, dependent upon the direction of rotation.

The grooves of one pair contour in opposite directions to those of the other, so that the movement of one pair of wires will be at increasing speed and those of the other at decreasing speed, in order that, during a given amount of rotation of the drum, more movement will be imparted to one pair of wires and the aileron controlled thereby than to the other pair and its aileron.

Figure 11:
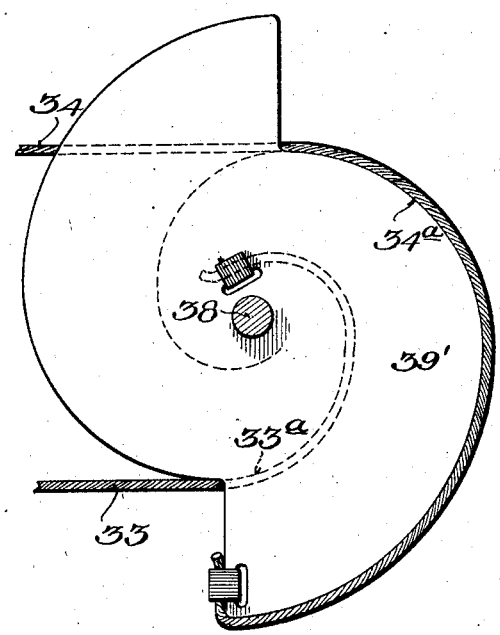
Fig. 11 is a similar view of the other member of the alternative winding and unwinding arrangement.
Figure 10:
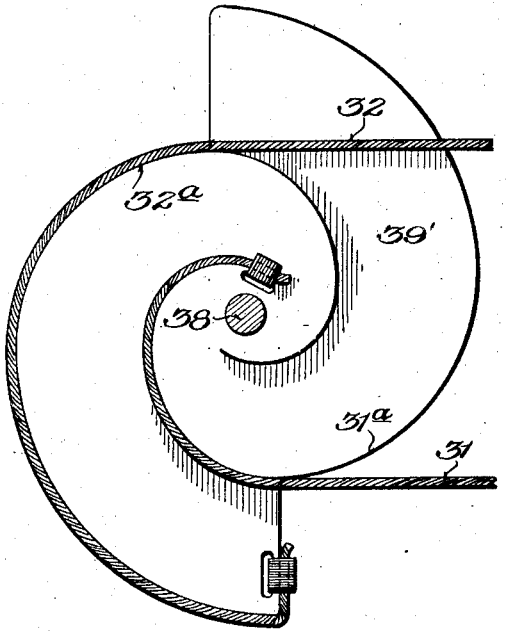
Fig. 10 is a view of one of the members of an alternative form of winding and unwinding arrangement, showing disposition of control-wires.

A winding-drum of the character described is exemplified by Figs. 8 and 9. If desired, separate members 39' of generally conical contour may be used in place of drum 39, each of them having grooves for a pair of wires, as shown by Figs. 10 and 11.

Referring particularly to Figs. 8, 9, 10, and 11, wires 31 and 32 of a pair are secured in and arranged to lie in and pay out from grooves 31$^a$ and 32$^a$, respectively, and wires 33 and 34 of the other pair are arranged similarly in association with the other pair of grooves 33$^a$ and 34$^a$, respectively.

The relative disposition of the wires is such that the pull and pay out of those of one pair to lift the rear portion of one aileron will be at increasing speed and those of the other pair will be at decreasing speed in depressing the rear portion of the other aileron, with the result that the angularity at which the former is set is greater than that at which the latter is set as a result of a given amount of rotation.

If, for example, on disturbance of the equilibrium of the airplane, the aileron controlled by the pair of wires 31 and 32 becomes, or is felt by the pilot to be about to become, the high one, the shaft is turned over in the direction of that side to lift the rear portion of that aileron and to depress the rear portion of the other or low aileron; and, because of the differential motion given the two ailerons, the high one is set at a greater relative angle in one direction than the low is set in the other direction.

Moreover, the relative formation and arrangement of the several elements of the control instrumentalities is such that, even when a sufficient amount of lifting movement is given to the rear portion of one aileron to bring it up to its maximum angle, the angle in the other direction to which the other aileron is brought is not sufficient to cause the resistance to the air or forward motion to equal that of the aileron that has been drawn up. As a result of the aileron on the high side being moved to a greater angle than that of the low side and the setting up of a greater resistance on the high side, the tendency of the machine will be to turn toward that side during the period in which the ailerons are set to recover equilibrium.

This turning tendency is present when the ailerons are hinged to form rear marginal portions of the ends of a sustention-plane, as well as when they are set away from the planes. In the position wherein an aileron pockets with the sustention-plane above it, the turning action is most decided, due to the greater resistance set up by this pocket effect, and for some machines this type is more desirable than any other.

The shaft 38 may be placed in any suitable position in the machine. Usually it is mounted in association with instrumentalities convenient to the pilot for controlling other parts of the machine besides the ailerons.

For example, the shaft may be mounted as shown particularly by Figs. 12 and 13, wherein it is rotated by a hand-wheel 40 and is carried at the upper portion of a substantially U-shaped frame 41. The frame is pivotally mounted in its lower portion on journals 42, through which the aileron-control wires 31, 32, 33, and 34, lead, so that it may be swung by the pilot in a fore and aft direction to impart movement to the wires 43 and 44 connected above and below the pivotal axis and controlling the elevation-rudders 24, without affecting the aileron-wires.

Aileron-operating instrumentalities such as herein described also may be associated with the so-called "stick" system of airplane control, as exemplified by Fig. 14. In that figure, a shaft 45 is rotatably mounted and disposed in a fore and aft direction in the fuselage. A control-lever 46 is pivotally mounted on the shaft at 47 to swing in a fore and aft direction to give movement to the elevation-rudder control-wires 43 and 44 leading through a guide 48 in the axial line of shaft 45. When the lever is swung from side to side it rocks the shaft 45 without affecting the control-wires 43 and 44, and through the instrumentality of a segmental rack 49 on that shaft in mesh with a pinion 50 on the shaft 38 the drum 39 is rotated and caused to operate the ailerons in the same manner as in the case of the previously-described arrangement.

Having thus described my invention, what I claim as new, and desire to secure by Letters Patent, is—

1. In an airplane, the combination of an aileron in each side portion thereof, means arranged to move said ailerons from normal position and including a pair of flexible members for each of them, and a rotatable operating device connected with said flexible members and having a pair of grooves for each pair of said members increasing in distance from the axis, the grooves of one pair contouring in opposite directions to those of the other whereby on rotation of the device more movement is imparted to one pair of said members than to the other.

2. In an airplane, the combination of an aileron in each side portion thereof, means arranged to move said ailerons from normal position and including a pair of flexible members for each of them, and rotatable winding means to which said flexible members are connected having for each pair of said members a pair of grooves each of which commences near the axis at a place substantially diametrically opposite to the other and continues in a contour increasing in distance from the axis, the grooves of one pair contouring in opposite directions to those of the other.

3. In an airplane, the combination of an aileron in each side portion thereof, a device to control other movable parts of the machine, means connected to move said ailerons from normal position and including a pair of flexible members for each of them, a shaft rotatably mounted in association with said device, and winding means on said shaft to which said flexible members are connected, having for each pair of said members a pair of grooves each of which commences near the axis at a place diametrically opposite to the other and continues in contour increasing in distance from the axis, the grooves of one pair contouring in opposite direction to those of the other.

In witness whereof, I have affixed my signature.

ARTHUR R. SMITH.